(12) United States Patent
Wakim

(10) Patent No.: US 9,007,229 B1
(45) Date of Patent: Apr. 14, 2015

(54) SENSOR BASED RECOMMENDATIONS

(75) Inventor: Peter A. Wakim, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 194 days.

(21) Appl. No.: 13/528,288

(22) Filed: Jun. 20, 2012

(51) Int. Cl.
*G08B 21/00* (2006.01)
*G08B 13/12* (2006.01)

(52) U.S. Cl.
CPC ...................................... *G08B 13/12* (2013.01)

(58) Field of Classification Search
CPC .................. G06Q 30/0252; G06Q 30/0251
USPC ........................................................ 340/669
See application file for complete search history.

(56) References Cited

U.S. PATENT DOCUMENTS

| | | | |
|---|---|---|---|
| 2006/0197538 A1* | 9/2006 | Leinonen et al. | 324/533 |
| 2010/0094502 A1* | 4/2010 | Ito et al. | 701/36 |
| 2011/0288917 A1* | 11/2011 | Wanek et al. | 705/14.5 |
| 2012/0029947 A1* | 2/2012 | Wooldridge et al. | 705/4 |
| 2013/0145297 A1* | 6/2013 | Ricci et al. | 715/765 |

* cited by examiner

*Primary Examiner* — Kerri McNally
(74) *Attorney, Agent, or Firm* — Sutherland Asbill & Brennan LLP

(57) ABSTRACT

User devices are used to access various forms of electronic content. Sensors in the user device or information about environmental data associated with the device, such as weather at the locale of the user device, may be used to determine the occurrence of physical events. Recommendations such as offers for sale of extended warranties, warranty replacement, and so forth may be provided based at least in part on the physical events.

21 Claims, 10 Drawing Sheets

SENSOR BASED RECOMMENDATIONS

BACKGROUND

A variety of user devices, such as electronic book ("e-Book") reader devices, desktop computers, portable computers, smartphones, tablet computers, and so forth are used to access various forms of electronic content. Extended warranties, support agreements, protective devices, and so forth may be offered at a time of sale. However, a consumer may not take advantage of these goods or services at that time.

Figure 1:
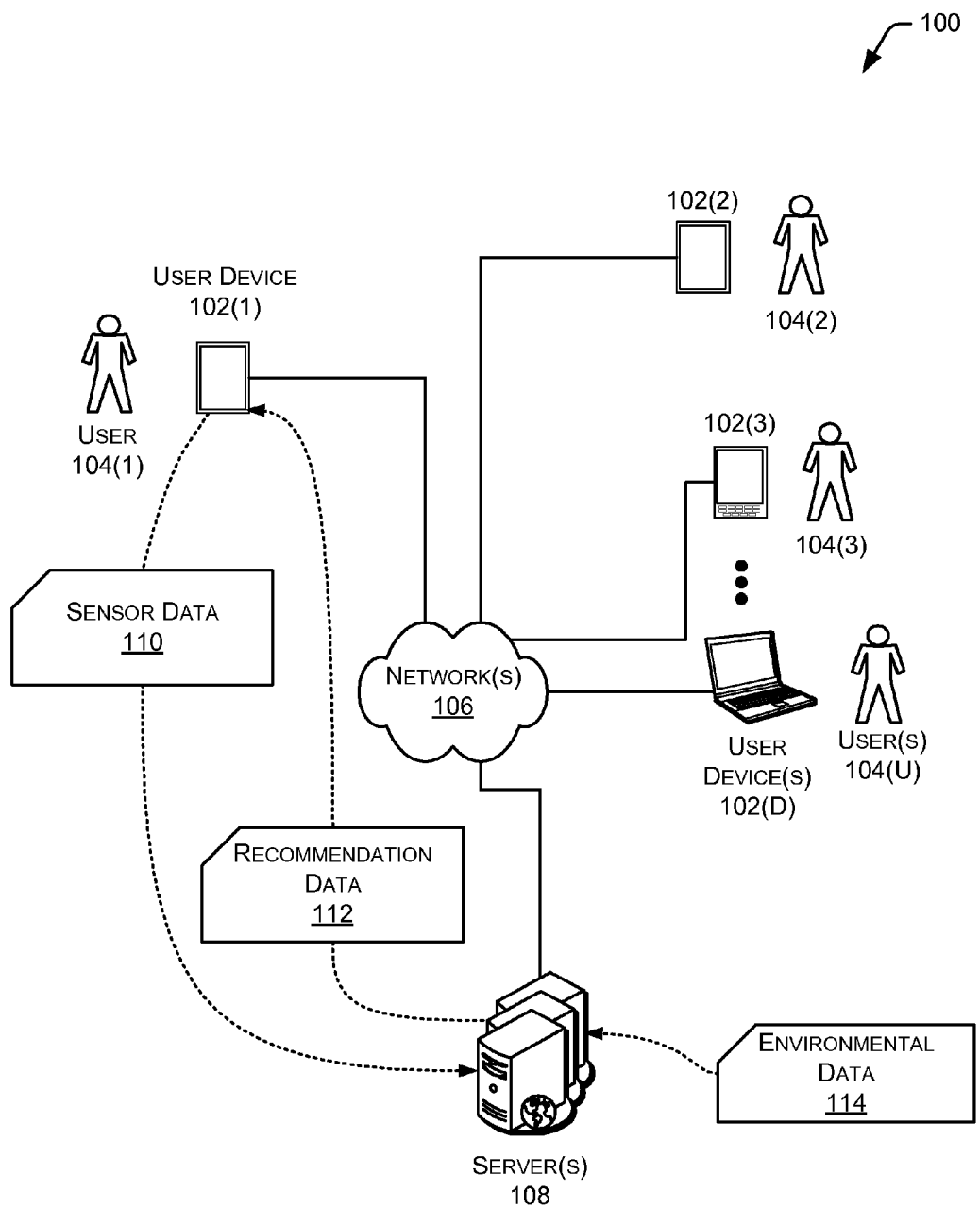
FIG. 1 illustrates a system for determining physical events associated with a user device and generating a recommendation based at least in part on the physical events in accordance with an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

A variety of user devices, such as electronic book ("e-Book") reader devices, desktop computers, portable computers, smartphones, tablet computers, and so forth are used to access various forms of electronic content. Users access this content from a variety of locations and during activities ranging from participating in a meeting to engaging in sporting activities. The portability and ubiquity of these user devices place them in situations in which they may be damaged or destroyed. While users may be offered items such as extended warranties, protection plans, protective devices, and so forth during checkout, adoption rates are traditionally low. One reason for these low adoption rates is that many users do not perceive they personally will have a need for the items and the benefits they provide.

Described herein are systems and methods for using sensor data, environmental data, or a combination thereof to identify physical events affecting, or which may affect, the user device. One or more items are recommended to the user, based at least in part on these physical events. In some implementations, presentation of the recommendation may be made contemporaneous to occurrence of the physical event.

Physical events include, but are not limited to, drops, impacts, exposure to moisture, exposure to extreme temperatures, accidents, and so forth. The physical events may be identified using data from one or more sensors in or associated with the user device. The data is analyzed to determine when a physical event has occurred.

The physical events may be identified using information gathered from other sources external to the user device. This information may be provided by a network connection available to the user device or to another device such as a server. For example, a server may receive location information about the user device and weather information via the Internet indicating high humidity in the location of the user device which is above a pre-determined threshold.

Based at least in part on the physical events, recommendations for one or more items may be made. For example, after a device is dropped, an extended warranty service may be recommended and offered to the user, or the presence of the device in a rainy area may produce a recommendation for a water-resistant cover. These recommendations may be presented by the user device, or by another device contemporaneous to the physical event. Continuing the example, when a child drops a user device, the child's parent may receive the recommendation for the extended warranty service. Because the recommendation is contemporaneous to the event, user response to the recommendations may be improved.

Illustrative System

FIG. 1 illustrates a system 100 for determining physical events associated with a user device and generating a recommendation based at least in part on the physical events. One or more user devices 102(1), 102(2), 102(3), . . . 102(D) may be used by one or more users 104(1), 104(2), 104(3), . . . 104(U). As used herein, letters enclosed by parenthesis such as "(U)" indicate an integer having a value greater than zero. The user devices 102 may include e-Book reader devices, laptops, tablet computers, game devices, media players, and so forth. The user devices 102 are described in more detail below with regard to FIG. 2.

The user device 102 may be configured to connect to a network 106. This coupling may be wired or wireless. The network 106 may include, but is not limited to, the Internet, a private network, a virtual private network, a wireless wide area network, a cellular data network, a local area network, a metropolitan area network, a telephone network, and so forth. The network 106 may also be coupled to a server 108 and other devices. The user devices 102 may exchange information with other user devices 102 or with the server 108 via the network 106. This information exchanged may include one or more of sensor data 110, recommendation data 112, or environmental data 114.

As described below with regard to FIG. 2, the user device 102 may comprise one or more sensors. These sensors may generate sensor data 110 which describes one or more physical conditions associated with the user device 102. For example, an accelerometer may provide information about the motion of the user device 102. The sensor data is described below in more detail with regard to FIG. 3.

The server 108 may use the sensor data 110, other information about environmental data associated with the user device 102, or a combination thereof to identify physical events which have affected or may affect the user device 102 to generate recommendation data 112. The recommendation data 112 may comprise one or more items such as goods or services which may be of interest to the user 104 of the user device 102. These one or more items may include extended warranties, repair services, warranty services, user device upgrades, personal services, vehicular services, and so forth. The server 108 is described below in more detail with regard to FIG. 4.

The recommendation data 112 or a portion thereof may be presented on the user device 102 or another device. For example, after the user 104(1) drops the user device 102(1), an advertisement for an extended warranty may be presented on a display.

The environmental data 114 provides information about the environment in which the user device 102 may be present. The environmental data 114 may include meteorological information such as current and predicted weather, civil data such as crime statistics, sunrise and sunset times for the sun, and so forth.

In some implementations, the user device 102 may be configured to identify the physical events and provide a previously stored recommendation. For example, where the user device 102 is unconnected to the network 106, the physical event of the drop may still result in the presentation of the advertisement for the extended warranty.

Figure 2:
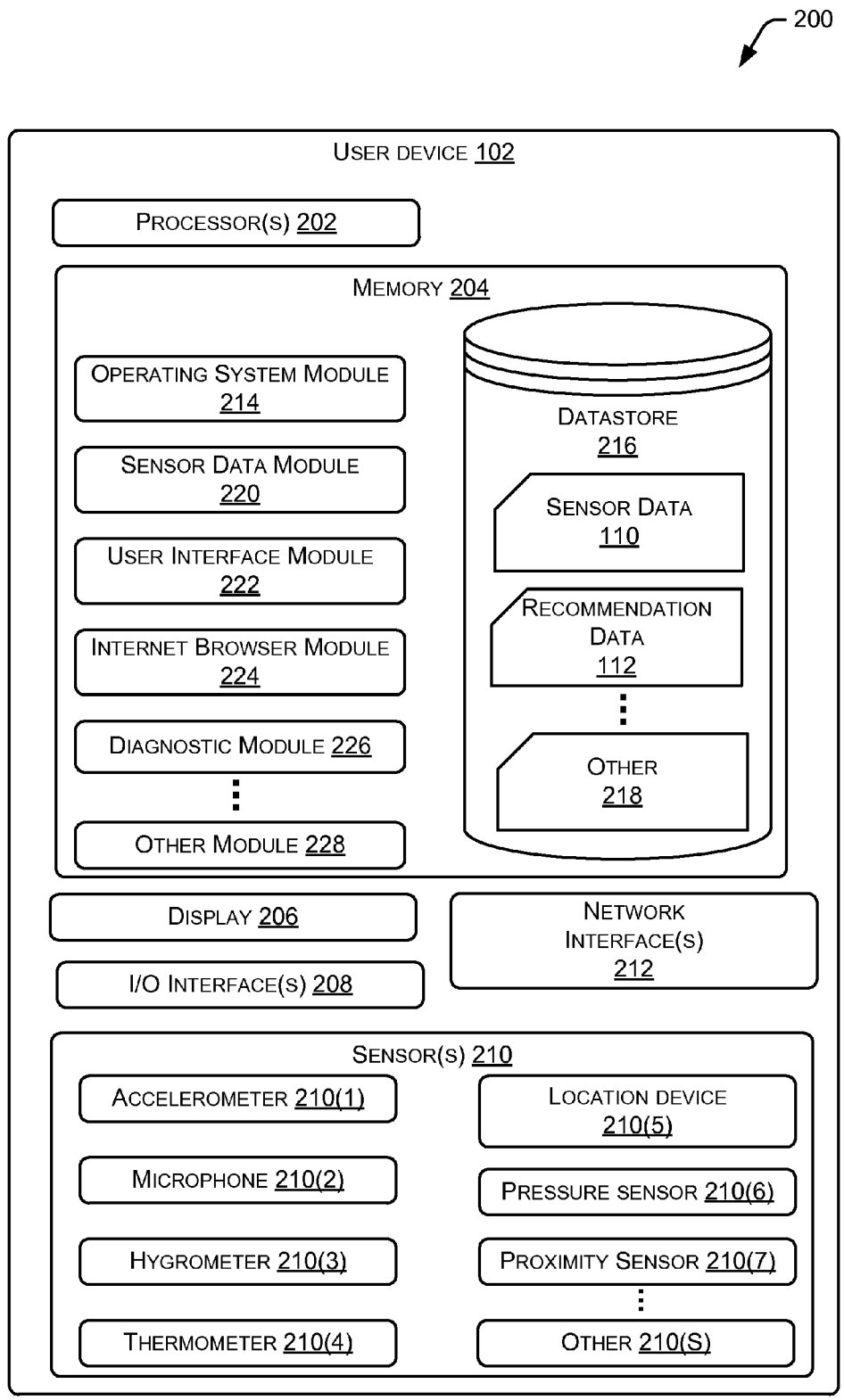
FIG. 2 illustrates a block diagram of the user device including sensors configured to provide sensor data in accordance with an embodiment of the disclosure.

FIG. 2 illustrates a block diagram 200 of a user device 102 including sensors configured to provide sensor data. The user device 102 may comprise one or more processors 202, one or more memories 204, one or more displays 206, one or more input/output ("I/O") interfaces 208, one or more sensors 210, and one or more network interfaces 212. The user device 102 may include other devices not depicted.

The processor 202 may comprise one or more cores and is configured to access and execute at least in part instructions stored in the one or more memories 204. The one or more memories 204 comprise one or more computer-readable storage media ("CRSM"). The one or more memories 204 may include, but are not limited to, random access memory ("RAM"), flash RAM, magnetic media, optical media, and so forth. The one or more memories 204 may be volatile in that information is retained while providing power or non-volatile in that information is retained without providing power.

The display 206 is configured to present visual information to the user 104. The display 206 may comprise a reflective or emissive display configured to present images to the user 104. An emissive display emits light to form an image. Emissive displays include, but are not limited to, backlit liquid crystal displays, plasma displays, cathode ray tubes, light emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The display 206 may be configured to present images in monochrome, color, or both. In some implementations, the display 206 of the user device 102 may use emissive, reflective, or combination displays with emissive and reflective elements.

The one or more I/O interfaces 208 may also be provided in the user device 102. These I/O interfaces 208 allow for coupling devices such as keyboards, joysticks, touch sensors, cameras, microphones, speakers, haptic output devices, external memories, and so forth to the user device 102.

The user device 102 may include one or more sensors 210. These sensors may include one or more accelerometers 210(1), microphones 210(2), hygrometers 210(3), thermometers 210(4), location devices 210(5), pressure sensors 210(6), proximity sensors 210(7), and other sensors 210(S). The one or more accelerometers 210(1) are configured to determine a change in motion of the user device 102. The accelerometers 210(1) may be configured to provide magnitude or scalar information, such as an acceleration of 5 meters per second per second ($m/s^2$), or vector information such as 5 $m/s^2$ along a particular axis of the user device 102. As used herein, acceleration includes changes in velocity over time. This may include linear, rotational, and other motions. For example, increasing the speed and decreasing the speed user device 102 are accelerations.

The one or more microphones 210(2) may be configured to acquire sound information. For example, the sound of rain or wind may be acquired by the microphone 210(2) and used to determine a physical event such as the user device 102 being exposed to a rainstorm. In another example, a sound of the user device 102 hitting an object or surface such as during a fall may be acquired and used to determine that an impact may have taken place without data from an accelerometer 210(1). Sound may also be used at least in part to identify an accident involving the user device 102. This accident may involve bicycles, automobiles, trains, and so forth. For example, the sound of an airbag deploying, of metal scraping on metal, glass breaking, and so forth may be used to determine the physical event of an automobile accident.

The one or more hygrometers 210(3) may be used to generate sensor data about humidity in the environment or immersion of the user device 102. For example, the user device 102 may be designed for exposure to humidity levels below 80% without damage. As a result, the sensor data from the one or more hygrometers 210(3) describing a 100% relative humidity may be identified as a physical event for which a recommendation for a water resistant cover may be provided.

The one or more thermometers 210(4) may provide temperature data associated with the user device 102. These temperatures may be internal to the user device 102, such as within the chassis proximate to the processor 202, or external to the user device 102. For example, several physical events where the user device 102 has been exposed to temperatures below its design operating range may result in a recommendation for another user device designed for operating in that environment.

The one or more location devices 210(5) such as global positioning system or other navigation or positional devices may provide information such as a location of the user device 102, velocity of the user device 102, direction of travel of the user device 102, and so forth. This location information may be geographic location (or "geolocation") data such as a particular set of coordinates on the surface of the Earth, or may be a relative location such as "in the kitchen" or "at the office." In one example, when the location of the user device 102 is determined to be on a body of water such as a lake, the user 104 may receive a recommendation for a floating cover for the user device 102.

The one or more pressure sensors 210(6) may be used to provide barometric readings, altitude information, and so forth. Continuing the example, sensor data from the pressure sensor 210(6) indicating a falling air pressure along with an increase in humidity detected by the hygrometer 210(3) may indicate the user device 102 is experiencing wet weather.

The one or more proximity sensors 210(7) may provide an indication as to whether the user device 102 is proximate to another device or surface. In some implementations, the proximity sensors 210(7) may be configured to provide information as to whether the proximate object is the user 104, or an inanimate object such as a table. For example, sensor data from the accelerometer 210(1) indicating a fall, combined with an indication from the proximity sensor 210(7) that the user device 102 is not near another object, combined with readings from the hygrometer 210(3) indicating immersion, may be used to determine that the physical event is the user device 102 being dropped into water. Determination of this physical event may be used, at least in part, to generate a recommendation for a warranty repair or to void at least part of an existing warranty.

Other sensors 210(S) may be present in or associated with the user device 102 to provide sensor data 110. For example, the other sensors 210(S) may include an ambient light sensor configured to provide data as to whether the user device 102 is in sunlight.

The one or more network interfaces 212 provide for the transfer of data between the user device 102 and another device directly such as in a peer-to-peer fashion, via the network 106, or both. The network interfaces 212 may include, but are not limited to, personal area networks ("PANs"), wired local area networks ("LANs"), wireless local area networks ("WLANs"), wireless wide area networks ("WWANs"), and so forth. The network interfaces 212 may utilize acoustic, radio frequency, optical, or other signals to exchange data between the user device 102 and another device such as an access point, a host computer, another user device 102, and the like.

The one or more memories 204 may store instructions or modules for execution by the processor 202 to perform certain actions or functions. The following modules are included by way of illustration, and not as a limitation. Furthermore, while the modules are depicted as stored in the memory 204, in some implementations, these modules may be stored at least in part in external memory, such as in the server 108 which is accessible to the user device 102 via the network 106. These modules may include an operating system module 214 configured to manage hardware resources such as the I/O interfaces 208 and provide various services to applications or modules executing on the processor 202.

The one or more memories 204 may also store a datastore 216. The datastore 216 may comprise one or more databases, files, linked lists, or other data structures. The datastore 216 may be configured to store at least a portion of the sensor data 110, the recommendation data 112, or other data 218.

A sensor data module 220 is stored in the memory 204. The sensor data module 220 is configured to receive sensor data 110 from the one or more sensors 210. The sensor data module 220 may be configured to identify one or more physical events based at least in part on the sensor data 110. The sensor data module 220 may be configured to implement one or more pre-determined thresholds. In some implementations, different thresholds may be assigned to different sensors 210. Minimum thresholds may be set such that "noise" or sensor data 110 associated with routine activities of the user device 102 are not designated as physical events. Maximum or damage thresholds may be established indicating conditions at which the user device 102 is likely to be damaged or has been damaged. For example, a minimum threshold of 3 m/s$^2$ may be set for accelerations measured by the accelerometer 210(1) such that casual walking while carrying the user device 102 does not result in identification of a physical event. In comparison, a maximum threshold of 50 m/s$^2$ may be identified as a damaging physical event. The thresholds may be static or dynamically adjustable. For example, based at least in part on other sensor data 110 or environmental information, the thresholds may increase or decrease.

A user interface module 222 is configured to provide a user interface which handles inputs from and outputs to the user 104 during operation of the user device 102. User input may include key presses, touches on a touch screen, movement of the user device 102 or a portion thereof, speech input, and so forth. User outputs may include presentation on the display 206, sound from a speaker, haptic output generating a physical sensation or the appearance of a physical sensation, and so forth. The user interface module 222 may be configured to provide information such as at least a portion of the recommendation data 112 comprising one or more items on the display 206, and accept input such as an order from the user 104 for the one or more recommended items.

An internet browser module 224 is configured to provide access to content such as web pages and so forth. For example, the internet browser module 224 may be configured to render at least a portion of hyper-text markup language ("HTML") files on the display 206. In some implementations, the recommendation data 112 or a portion thereof may be presented by the internet browser module 224.

A diagnostic module 226 is stored in the memory 204 and configured to perform one or more tests indicative of an operational state or condition of at least a portion of the user device 102 and generate one or more diagnostic results. The diagnostic module 226 may be configured to check operation of the processor 202, the memory 204, the display 206, the I/O interfaces 208, devices attached to the I/O interfaces 208, the sensors 210, the network interfaces 212, and so forth. In some implementations, the recommendation generated by the server 108 may be determined based in part on the diagnostic results. For example, the diagnostic results may be used to verify the user device 102 is operational after a physical event such as a fall and before recommending an extended warranty.

Other modules 228 may be present in the memory 204 as well, such as virtual private networking modules, text-to-speech modules, speech recognition modules, and so forth.

Figure 3:
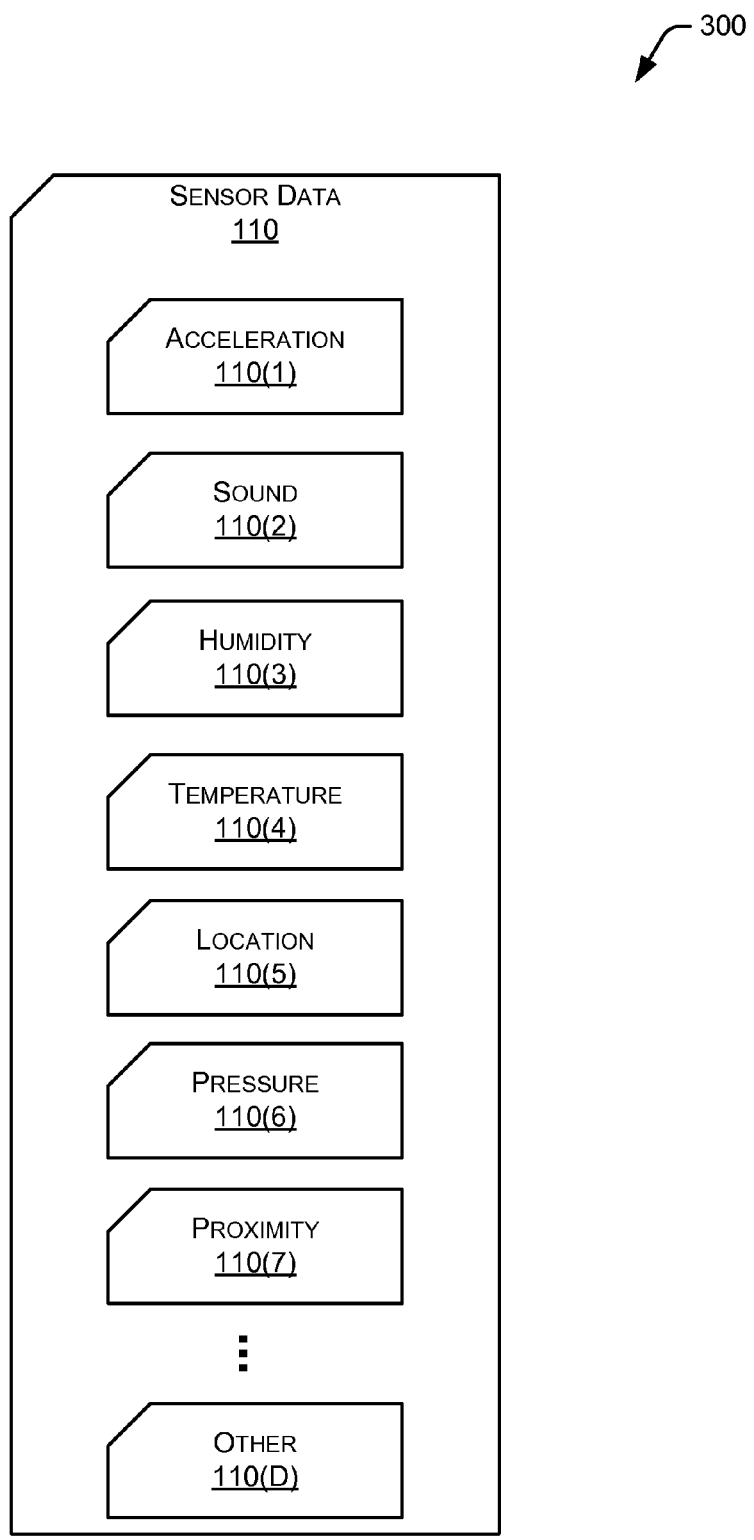
FIG. 3 illustrates a block diagram of sensor data acquired by the sensors of the user device in accordance with an embodiment of the disclosure.

FIG. 3 illustrates a block diagram 300 of the sensor data 110 acquired by the sensors of the user device 102. The sensor data 110 may be acquired and in some implementations analyzed by the sensor data module 220 to identify one or more physical events. In another implementation, the sensor data 110 or a portion thereof may be provided to the server 108 which determines the one or more physical events.

The sensor data 110 may include one or more of acceleration 110(1), sound 110(2), humidity 110(3), temperature 110(4), location 110(5), pressure 110(6), proximity 110(7), and other data 110(D). The sensor data 110 may be generated by the one or more accelerometers 210(1), the microphones 210(2), the hygrometers 210(3), the thermometers 210(4), the location devices 210(5), the pressure sensors 210(6), the proximity sensors 210(7), and other sensors 210(S), respectively.

Different user devices 102 may have different sensors 210 available. For example, the user device 102(1) may have an accelerometer 210(1) which provides acceleration data 110(1) while another user device 102(2) may have a microphone 210(2) but lack the accelerometer 210(1). Thus, different user devices 102 may generate different sensor data 110.

Figure 4:
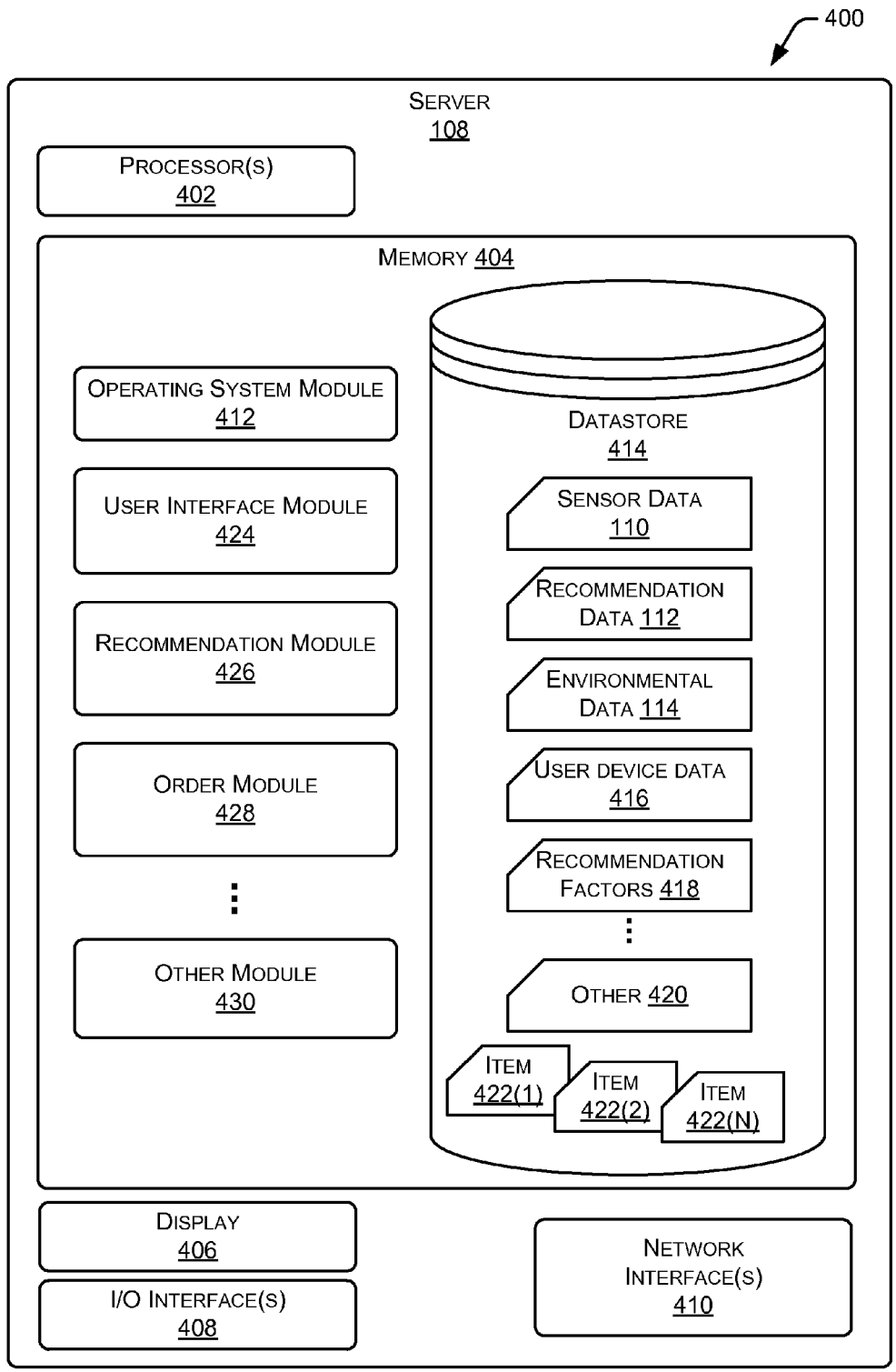
FIG. 4 illustrates a block diagram of a server configured to generate recommendations based at least in part on the sensor data in accordance with an embodiment of the disclosure.

FIG. 4 illustrates a block diagram 400 of the server 108 configured to generate recommendation data 112 based at least in part on the sensor data 110. The server 108 may comprise one or more processors 402, one or more memories 404, one or more displays 406, one or more input/output ("I/O") interfaces 408, and one or more network interfaces 410. The memory 404 may store an operating system module 412 and a datastore 414. These components are similar to those described above with regard to FIG. 2. The modules and the functions below are shown on a single server for illustrative purposes and not by way of limitation. It is understood that the modules and the functions associated therewith may be provided by, or distributed across, one or more other servers.

The datastore 414 may store at least a portion of the sensor data 110 received from the user devices 102, the recommendation data 112 provided to the user devices 102, environmental data 114, user device data 416, recommendation factors 418, and other data 420.

The user device data 416 provides information about one or more user devices 102. The user device data 416 may include information such as what sensors 210 are available on a particular user device 102, order history associated with the user device 102, and so forth.

The environmental data 114 may provide information about the environment in which the user device 102 may be present. The environmental data 114 may include meteorological information such as current and predicted weather, civil data such as crime statistics, sunrise and sunset times for the sun, and so forth.

The recommendation factors 418 are considerations or rules which are utilized in the recommendation process. For example, these recommendation factors 418 may be configured to reduce risk to an entity offering an extended warranty service by setting limits on when the extended warranty service may be recommended and purchased by the user 104 for the user device 102. In some implementations the recommendation factors 418 may be used to void at least a portion of an existing warranty. For example, repeated falls of the device may result in voiding coverage of the display 206 from damage. The recommendation factors are discussed below with regard to FIG. 5.

The other data 420 may include information such as payment account information for the users 104, relationships between user devices 102 and the users, and so forth. For example, the other data 420 may specify that the user 104(1) owns user devices 102(1) and 102(2), so recommendations should be provided to the user 104(1).

The datastore 414 may also store information about one or more items 422(1), 422(2), . . . , 422(N). The items 422 may describe goods or services which may be acquired or utilized by the user 104 for the user device 102. These may include extended warranties, repair services, warranty services, user device upgrades, protective covers, personal services, vehicular service, and so forth.

A user interface module 424 is stored in the memory 404. The user interface module 424 may be configured to provide a user interface, such as a web page, which is configured for display on the user device 102 or on another device.

A recommendation module 426 is configured to generate recommendations comprising recommendation data 112 based at least in part on the sensor data 110. This sensor data 110, as well as the recommendation data 112 or a portion thereof may be stored in the datastore 414. The recommendations may be based at least in part on one or more recommendation factors 418. For example, a recommendation for an extended warranty item 422 may be generated by the recommendation module 426 when the user device 102 has not experienced a physical event above a maximum threshold value and is less than ninety days old.

The recommendation factors 418 are described below in more detail with regard to FIG. 5. The recommendation module 426 may provide items 422 which are associated with the physical events or environmental factors associated with the device.

In some implementations, the recommendation module 426 or a portion of the functionality thereof may be provided by the user device 102. For example, a recommendation module 426 stored in the memory 204 may be configured to provide some recommendations to the user device 102 when the network 106 is unavailable.

An order module 428 is configured to accept and process the orders for the one or more items 422. For example, when the recommendation data 112 presents the user 104(1) with item 422(1) for an extended warranty on the user device 102(1), and the user 104(1) places an order for the item 422(1), the order module 428 takes payment and begins fulfillment of the order. In some implementations, the order module 428 may be provided by one or more other servers.

Other modules 430 may be present in the memory 404 as well. These modules may provide functions including authorization, authentication, accounting, security, and so forth.

Figure 5:
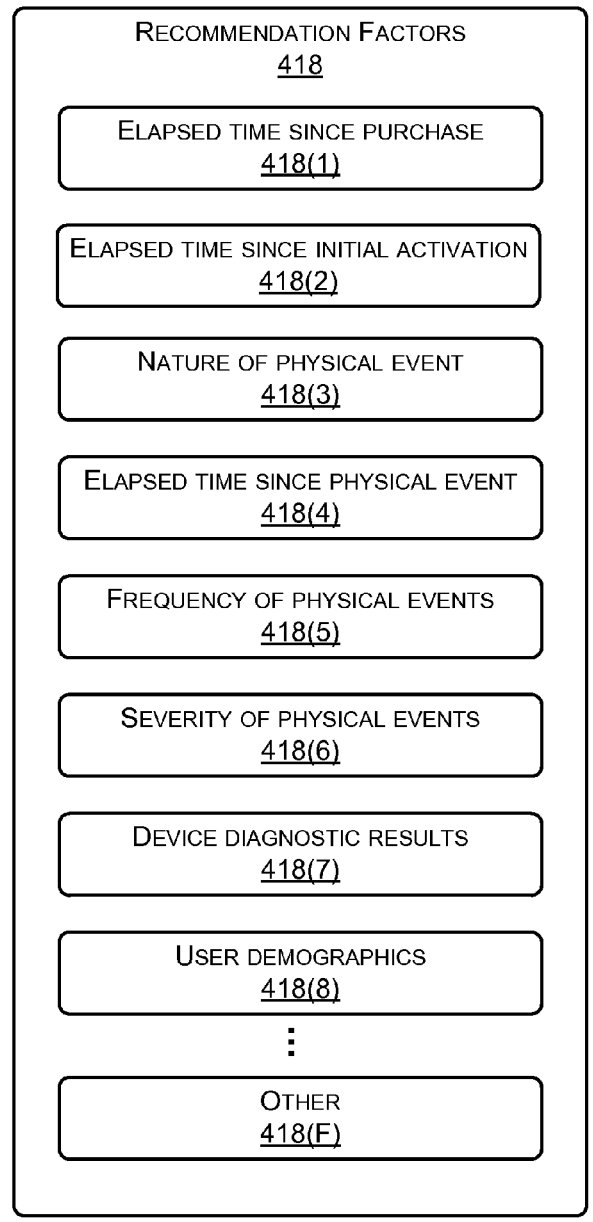
FIG. 5 illustrates a block diagram of recommendation factors which may be used by the server when generating recommendations in accordance with an embodiment of the disclosure.

FIG. 5 illustrates a block diagram 500 of recommendation factors 418 which may be used by the recommendation module 426 of the server 108 when generating recommendation data 112. Merchants, sellers, and designers of the user devices 102, warranty companies, and other interested parties may manage their risks associated with offering items 422 associated with the user devices 102. For example, a warranty provider may wish to have some assurance or indication that the user device 102 is operational before issuing an extended warranty which includes free replacement of the user device 102 to minimize fraud.

The recommendation factors 418 may be established for user devices 102, users 104, or combinations thereof. For example, a particular user 104 with several user devices 102 that experience frequent traumatic physical events may not be presented with recommendations for an extended warranty item 422. Thus, the availability of the items 422 may be based at least in part on the configuration of the recommendation factors 418.

The pricing of the items 422 may also be based at least in part on the recommendation factors 418. Continuing the example, the user 104 with the frequent traumatic physical events may be offered the extended warranty item 422, but at an increased cost given a greater risk that the extended warranty services are likely to be used.

One or more of the following recommendation factors 418 may be used by the recommendation module 426 to generate the recommendation data 112. An elapsed time since purchase 418(1) may be considered. For example, an extended warranty item 422(1) may only be available until ninety days after the purchase of the user device 102.

An elapsed time since initial activation 418(2) of the user device 102 may be considered. For example, the extended warranty item 422(1) may be available for fourteen days after initial activation and usage of the user device 102. This allows for purchase of the device and a period of disuse, such as when a gift remains unopened until the occurrence of a holiday.

A nature of the physical event 418(3) may be determined and stored. For example, when a device is dropped and immersed, this may be categorized as a "severe damage event" which may preclude offering the extended warranty item 422(1).

Elapsed time since physical event 418(4) may be considered. For example, after a non-damaging fall significant enough to generate a physical event, the extended warranty item 422(1) may be offered and good for only three days, after which it expires. Pricing of the item 422 may also be determined at least in part on the elapsed time since physical event 418(4). For example, pricing for the item 422(1) may decrease over time to encourage the user 104 to purchase the item.

A frequency of physical events 418(5) may be considered in generating the recommendation. For example, the occurrence of a large number of frequent physical events 418(5) may preclude offering an extended warranty item 422(1), or may increase the cost of that extended warranty item 422(1).

The recommendation factors 418 may include a severity of physical events 418(6). In some implementations, physical events may be assigned a severity on a scale of 0 to 10, with 10 being those which result in damage or are highly likely to result in damage. The severity may be determined based at least in part upon a magnitude of the physical event, duration, and other factors. For example, subjecting the user device 102 to a temperature in excess of 200 degrees Fahrenheit for more than twenty minutes may be determined to damage internal components and be assigned a severity of 10.

Device diagnostic results 418(7) may be used at least in part to generate the recommendation data 112. The results may indicate the operational state or health of one or more components in the user device 102. For example, device diagnostic results 418(7) indicative of a potential failure of the display 206 may be used to provide an extended warranty item 422(1) which omits protection coverage for the display 206. In another example, results which indicate no failures are observed or anticipated may result in offering the extended warranty item 422(1).

User demographics 418(8) for users 104 associated with the user devices 102 may be considered in the recommendation process. The users 104 may be associated with the user devices 102 by purchase, use, and so forth. The user demographics 418(8) may include a home location of the user 104, age of the user 104, occupation of the user 104, and so forth. For example, a more comprehensive extended warranty item 422(2) may be offered to younger users.

Other recommendation factors 418(F) may also be used in generating the recommendation data 112. For example, a percentage of usage of the user device 102 which occurs outdoors, as determined by ambient light sensors and location information, may be considered such that when the percentage is above a threshold amount items 422 for outdoor use are presented and items 422 for indoor use are omitted or listed less prominently.

Illustrative Processes

Figure 6:
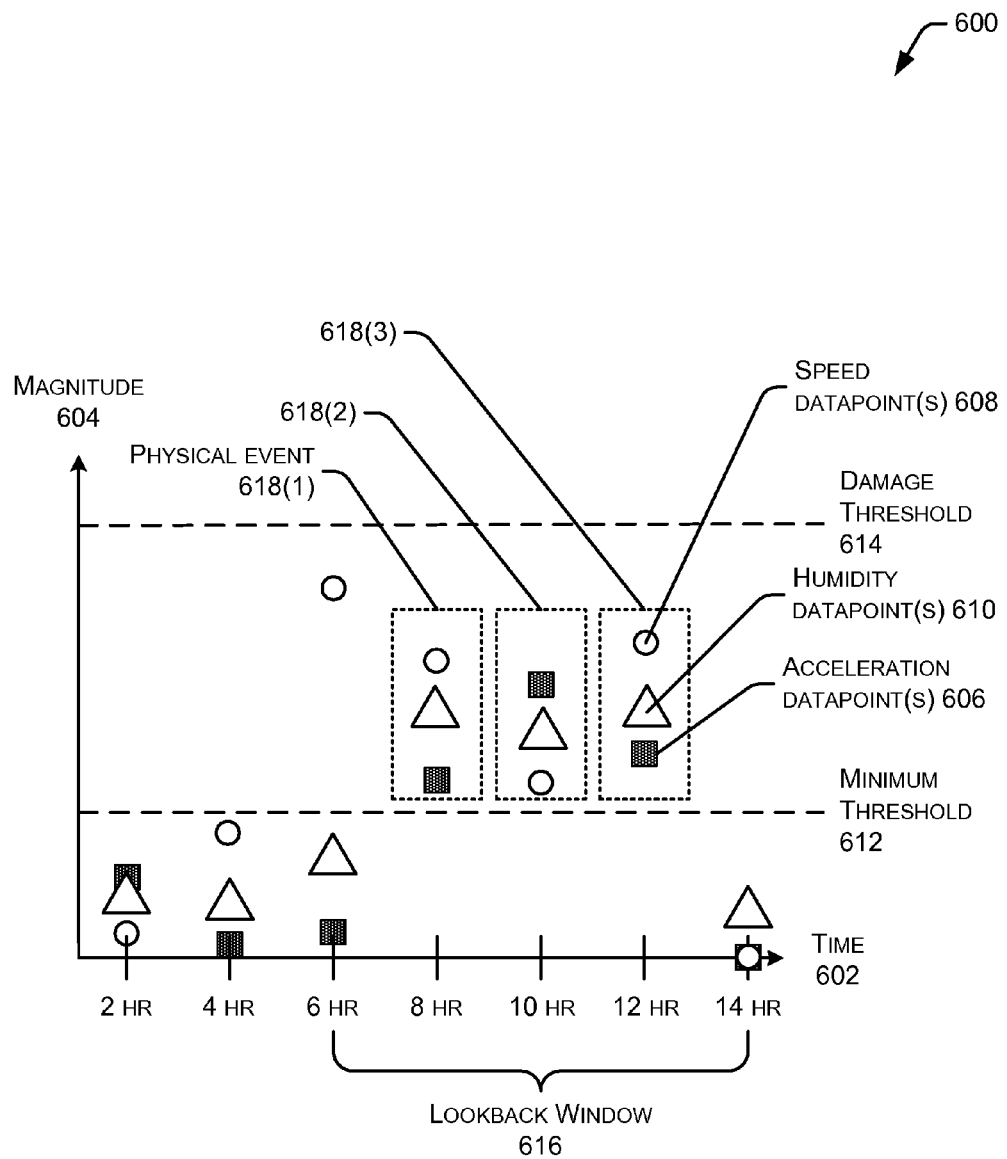
FIG. 6 is a graph illustrating data from different sensors in the user device and the physical events described thereby in accordance with an embodiment of the disclosure.

FIG. 6 is a graph 600 illustrating data from different sensors 210 in the user device 102 and the physical events described thereby. In this graph, time is indicated along a horizontal axis 602 ranging from time zero to fourteen hours. For the sake of illustration, consider that this describes a trip by the user 104. At time 2 hours, the user 104 leaves home and drives to the harbor. At time 8 hours, the user has boarded a fishing boat and is fishing until time 12 hours. Finally, at time hour 14, the user 104 has returned to the hotel to sleep.

A magnitude 604 of a physical event is indicated along a vertical axis. This magnitude 604 may comprise a scalar quantity such as temperature, m/s$^2$, humidity and so forth. In other implementations, the magnitude 604 may be representative of the severity of the physical events 418(6). In some implementations, vector quantities may be used.

In this graph, for ease of illustration and not by way of limitation, datapoints from sensor data 110 acquired from three different sensors are depicted. Acceleration datapoints 606 are represented by darkened squares. The acceleration datapoints 606 may indicate a maximum peak acceleration during the sample interval. These accelerations may be determined by the accelerometers 210(1). Speed datapoints 608 are indicated with circles and represent a maximum speed of the user device during the sample interval. This speed may be determined by the location device 210(5), such as output from a global positioning system receiver. Humidity datapoints 610 are indicated with triangles and represent a maximum relative humidity detected by the hygrometer 210(3) in the user device 102.

In some implementations, the sensor data 110 may be derived at least in part from sources other than sensors 210 within the user device 102 itself. For example, in this implementation, the server 108 may determine the speed and acceleration based on positioning or location data acquired by a cellular data network to which the user device 102 is coupled via one of the network interfaces 212. Humidity may be inferred based on environmental data about the weather in the locations at which the user device 102 is determined to be.

Shown here is a minimum threshold 612. A minimum threshold may be set for the identification of physical events, such that events having a magnitude less than the minimum threshold 612 are not deemed to be physical events. The minimum threshold 612 may be statically or dynamically set. Use of the minimum threshold 612 may prevent triggering a recommendation from otherwise routine activities, such as walking with the user device 102.

A damage threshold 614 is also depicted having a magnitude greater than the minimum threshold 612. The damage threshold 614 may be statically or dynamically set. The damage threshold 614 may be deemed to be the magnitude for a particular physical event or combination of physical events which results in, or is highly likely to result in, damage to the user device 102.

A lookback window 616 may be used by the recommendation module 426 during generation of the recommendation data 112. The lookback window 616 allows the recommendation module 426 to account for a pattern of occurrence of the physical events.

This graph 600 depicts a variation of the datapoints commensurate with exemplary use for the user device 102. The datapoints vary above and below the minimum threshold 612. In some implementations, the physical events may be identified by a concurrence of one or more physical quantities as measured or determined by the sensor data 110 which exceed the minimum threshold 612. For the example depicted here, and by way of illustration only, assume that physical events are identified when all three physical quantities being measured exceed the minimum threshold 612. Shown here are three physical events 618(1), 618(2), and 618(3) depicted at times 8, 10, and 12 hours, respectively, while the user 104 was fishing. During this time, the speed, acceleration, and humidity exceed the minimum threshold 612 in the same interval. Thus, these intervals are identified as containing physical events. In comparison, at time 6 hours, while driving on a highway, the speed datapoint 608 was quite high but the acceleration 606 and the humidity 610 datapoints were below the threshold.

Figure 7:
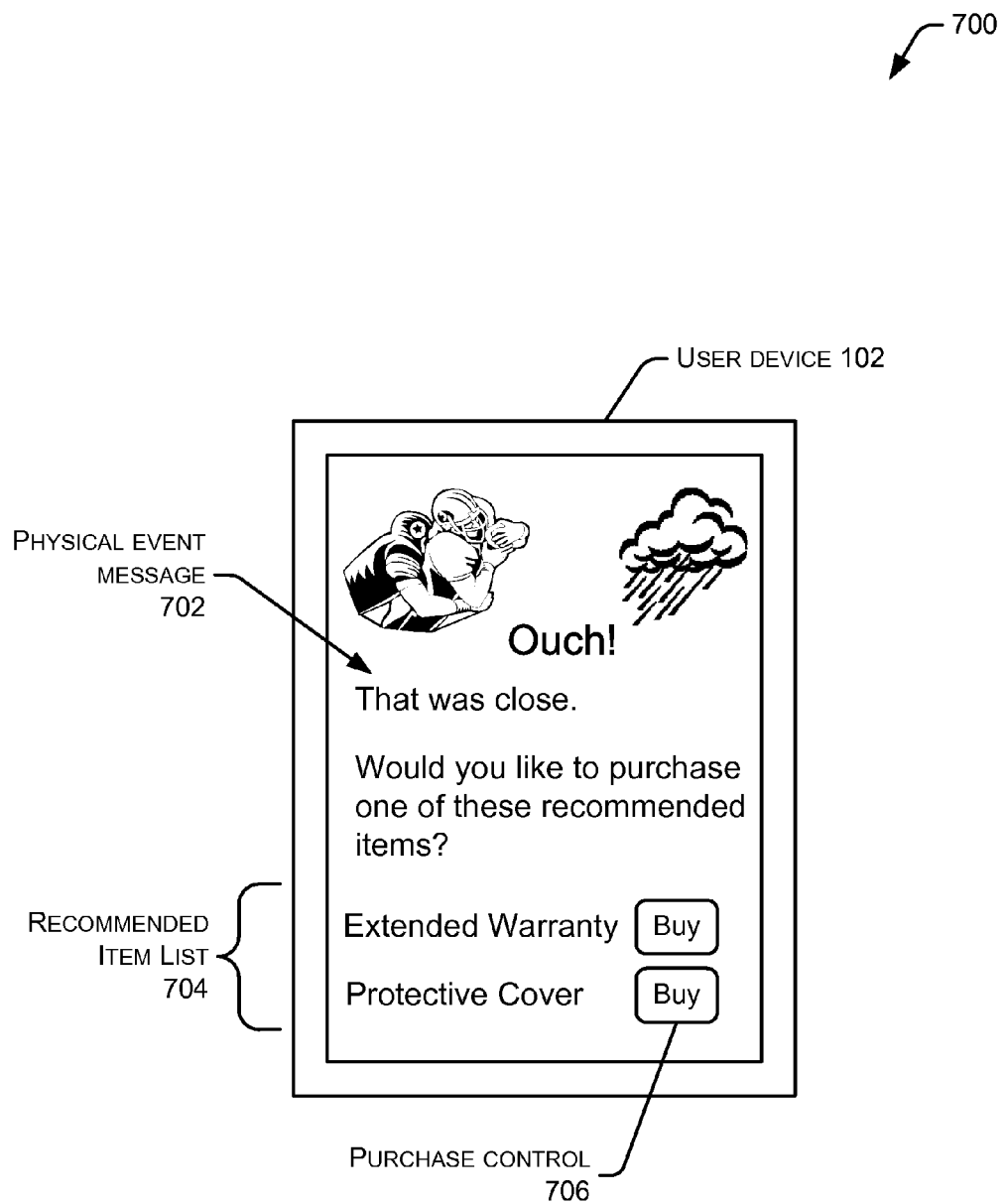
FIG. 7 illustrates a user interface of the user device presenting items recommended based, at least in part, on the sensor data in accordance with an embodiment of the disclosure.

FIG. 7 illustrates a user interface 700 of the user device 102 presenting recommended items 422. As described above, the recommendation may be based at least in part on the sensor data 110, environmental data 114, or both. As mentioned above, in some implementations, the recommendation data 112 or a portion thereof may be presented by the user device 102 as shown here. A physical event message 702 is displayed which provides an indication to the user 104 that a physical event has occurred or may occur. This physical event may be identified based at least in part on the sensor data 110 or the environmental data 114. For example, based at least in part on the sensor data 110 from the one or more accelerometers 210(1), an acceleration which has exceeded a minimum threshold has been identified as a physical event, such as a drop onto a hard surface.

A recommended item list 704 may be presented, presenting one or more items 422. In this example, an extended warranty and a protective cover are the recommended items 422. A purchase control 706 may also be presented. When activated, the corresponding item 422 may be purchase. This purchase may be processed by the order module 428 of the server 108. In some implementations, the purchase may be configured to occur automatically, such as when the user 104 has previously configured or approved this action.

In some implementations the recommendation may comprise an action by another party. For example, instead of or in addition to the information presented as shown here in FIG. 7, a service representative may communicate with the user 104 associated with the user device 102. For example, the service representative may call the user 104 at a previously determined telephone number, or initiate a chat session on the user device 102.

Figure 8:
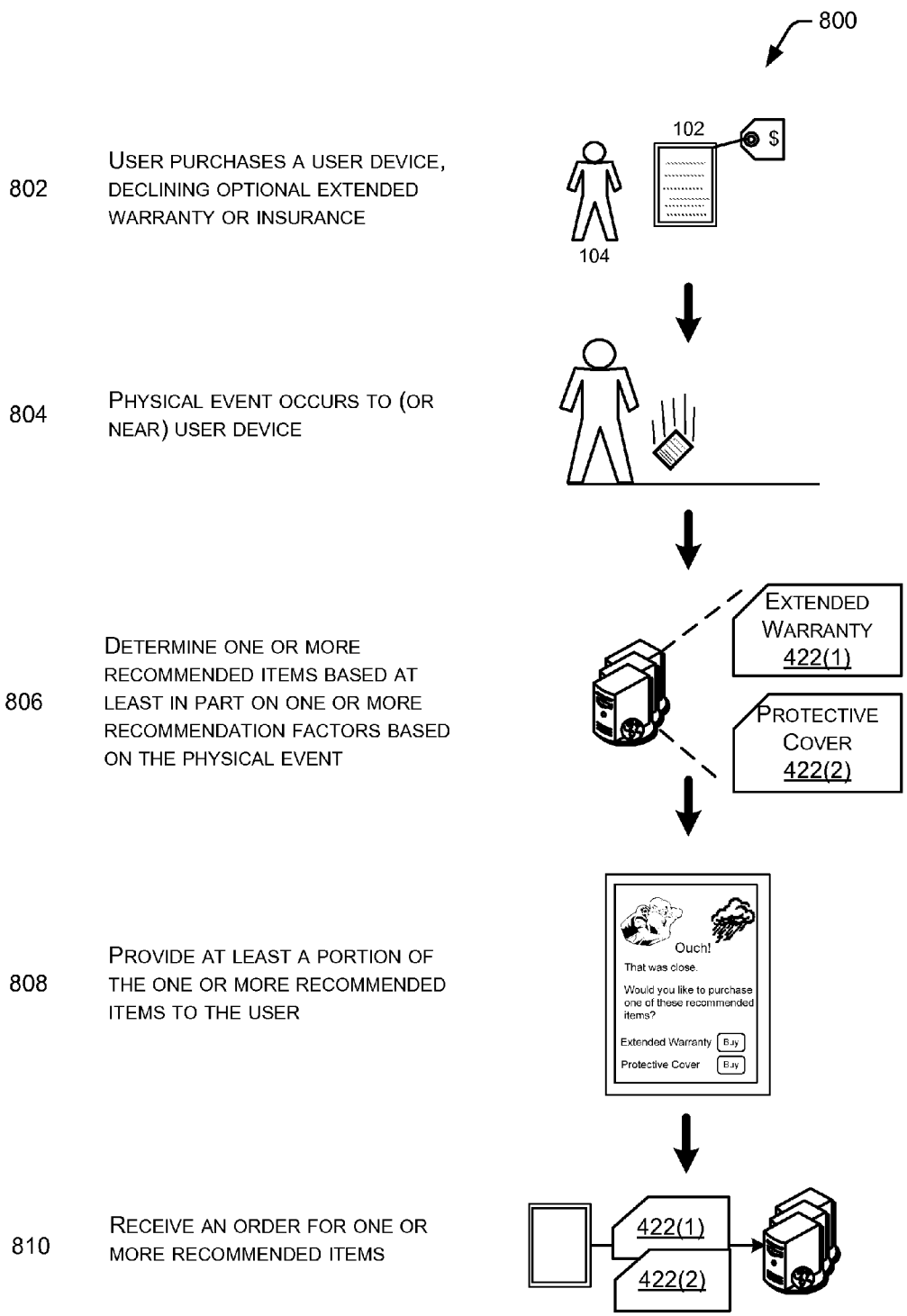
FIG. 8 illustrates a scenario in which a recommendation is made based at least in part on the sensor data in accordance with an embodiment of the disclosure.

FIG. 8 illustrates a scenario 800 in which a recommendation is made based at least in part on the sensor data 110. At 802, the user 104 purchases a user device 102. At that time of purchase, the user 104 may have been presented with various items 422 for purchase, such as extended warranties, insurance, protective covers, and so forth. However, for some reason, the user 104 chose not to purchase the items 422.

At 804, a physical event occurs to the user device 102. For example, the user 104 may have dropped the user device 102 onto the floor. This physical event may have been determined based on data from the one or more accelerometers 210(1) reporting acceleration 210(1) which exceeded the minimum threshold 612 but was below the damage threshold 614. As described, in some implementations, this may be a physical event based on environmental data 114, such as a rain storm.

At 806, the server 108 generates recommendation data 112 by determining one or more recommended items 422 based at least in part on the one or more recommendation factors 418. As described above, the recommendation factors 418 may be based in part on the physical event. For example, the recommendation factors 418 may take into account the magnitude, frequency, severity, and so forth of the physical events which have been identified in the sensor data 110. In this example, an extended warranty item 422(1) and a protective cover 422(2) item have been recommended.

At 808, at least a portion of the one or more recommended items 422 are provided to the user 104, or another user 104 affiliated with the user device 102. For example, the user interface 700 may be presented on the user device 102. In some implementations, instead of, or in addition to, the recommended items 422, a notification may be provided to the user 104 affiliated with the user device 102. For example, when the user 104(1) has loaned the user device 102(1) to the user 104(2), a notification such as a short message service ("SMS") message, email message, and so forth may be provided to the user 104(1) that a physical event has occurred.

At 810, an order is received by the server 108 for one or more recommended items. In this example, the user 104 may have decided to purchase both the extended warranty item 422(1) and the protective cover 422(2). The order module 428 may accept and process this order.

Figure 9:
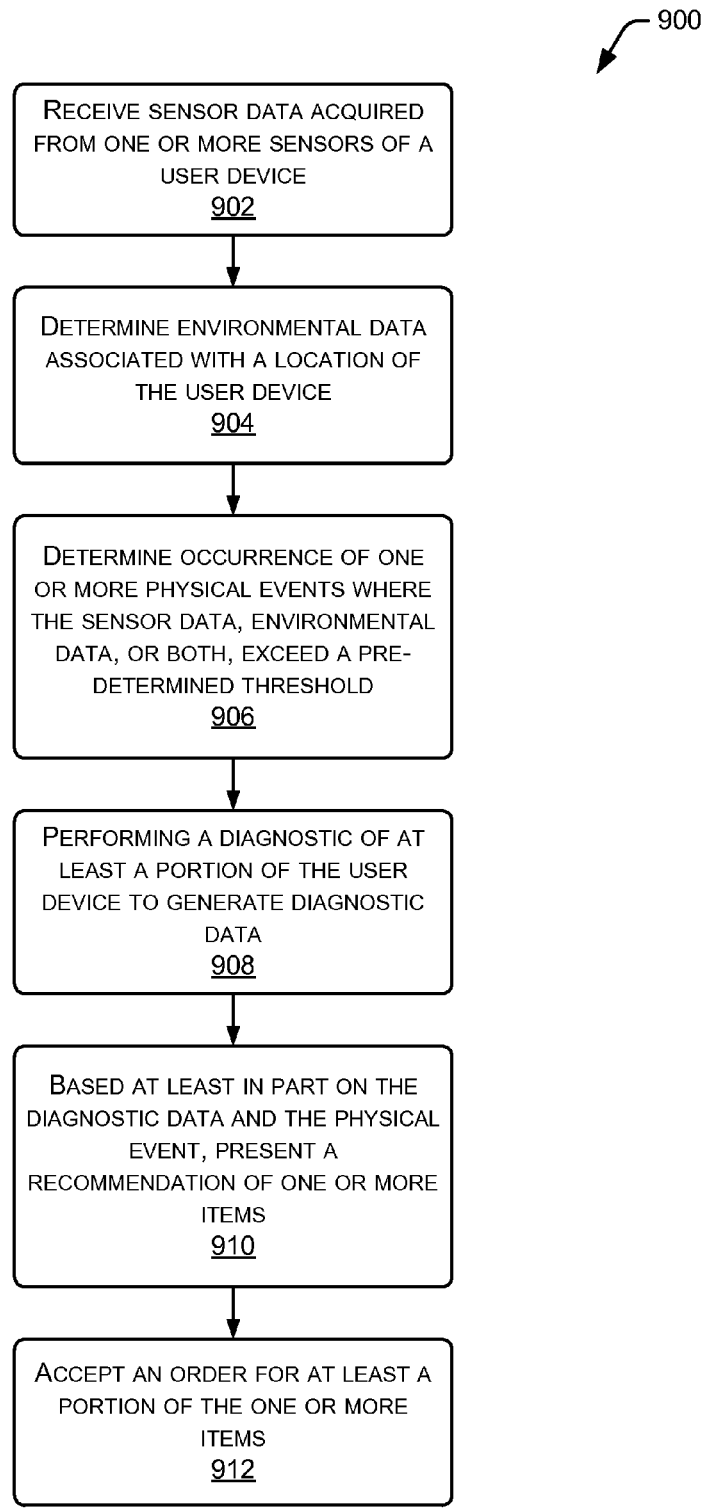
FIG. 9 illustrates a flow diagram of a process of presenting a recommendation based on sensor data from the user device in accordance with an embodiment of the disclosure.

FIG. 9 illustrates a flow diagram 900 of a process of presenting a recommendation based on sensor data from the user device. This process may be implemented by the recommendation module 426 on the server 108, on the user device 102, or by a combination thereof.

Block 902 receives sensor data 110 from one or more sensors 210 of the user device 102. For example, the sensor data 110 or a portion of the information from the one or more sensors 210 may be received by the sensor data module 220. In some implementations, the sensor data module 220 may apply some processing to the input, such as filtering readings to reduce the size of the sensor data 110. The sensor data module 220 may store the sensor data 110 in the datastore 216, or may transfer, via the network interface 212 or another I/O interface 208, at least a portion of the sensor data 110 to the server 108. As described above, the sensor data 110 may comprise information about acceleration, exposure to moisture, temperature, proximity to another object, and so forth.

Block 904 determines environmental data associated with a location of the user device 102. The environmental data may be determined by retrieving the environmental data 114 or other information via the network interfaces. For example, weather information associated with a location of the user device 102 may be retrieved from a weather information service. The environmental data may comprise current weather, predicted weather, past weather, or a combination thereof associated with a location of the user device 102.

Block 906 determines the occurrence of one or more physical events when the sensor data 110, the environmental data 114, or both indicates the one or more physical motions exceeds a pre-determined threshold. The sensor data 110 describes various physical characteristics associated with the user device 102 or the environment around it. As described above with regard to FIG. 6, data may indicate a particular physical condition or state which is deemed to be a physical event. For example, casual movements of the user device 102 in the hands of the user 104 may not be deemed a physical event, but dropping the user device 102 to the floor would be deemed a physical event. The identification may involve the use of pattern matching, comparison of data from a plurality of the sensors 210, and so forth.

Block 908 performs one or more diagnostic tests or receives diagnostic data about at least a portion of the user device 102. The one or more diagnostic tests or receipt of diagnostic data may be based at least in part on the determination of the occurrence of one or more physical events. As described above, this diagnostic data may be used to determine at least in part the operational condition of the user device 102. For example, the diagnostic data from the user device 102 may indicate when the display 206 is damaged.

In some implementations, when the physical events exceed the pre-determined damage threshold 614, the diagnostic tests may be omitted, repeated, or otherwise modified. For example, where the user device 102 has been subjected to a 1000 $m/s^2$ acceleration when the damage threshold is 500 $m/s^2$, the diagnostic tests may be omitted.

Block 910, based at least in part on the diagnostic data and the physical event, presents recommendation data 112 for one or more items 422. The recommendation data 112 may be generated by the recommendation module 426 based on the physical events. When the diagnostic returns diagnostic data indicating that the user device is operational within pre-determined limits, the one or more items 422 recommended may comprise an extended warranty for the device. When the diagnostic returns diagnostic data indicating that the user device is operational outside pre-determined limits or non-operational, the one or more items 422 recommended may comprise a repair service, a warranty replacement, and so forth.

Block 912 accepts an order for at least a portion of the one or more items 422. For example, the user may choose to order the extended warranty for the device.

Figure 10:
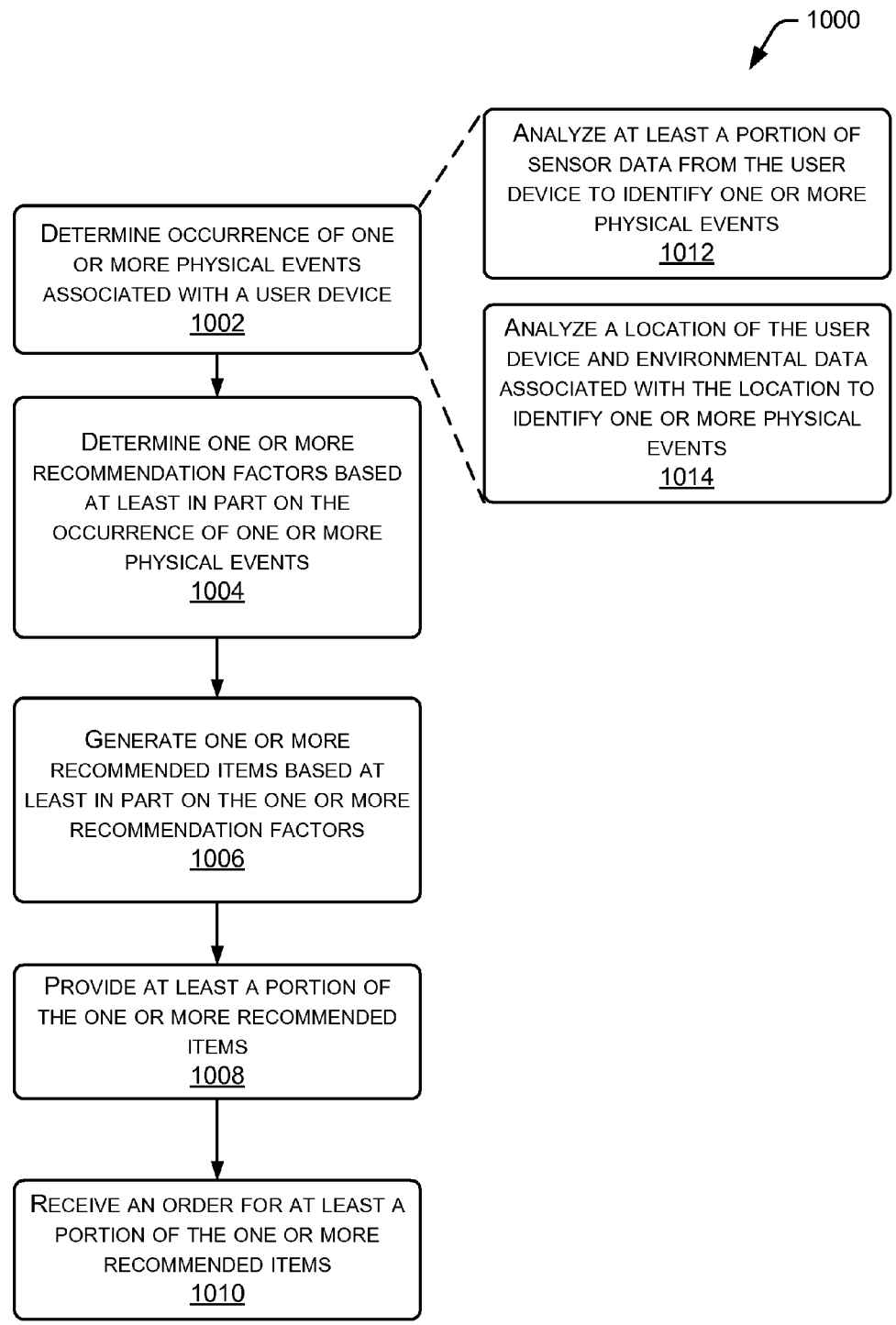
FIG. 10 illustrates a flow diagram of a process of a server providing a recommendation for one or more items in accordance with an embodiment of the disclosure.

FIG. 10 illustrates a flow diagram 1000 of a process of the server 108 providing a recommendation for one or more items 422. This process may be implemented by the recommendation module 426 on the server 108, on the user device 102, or by a combination thereof.

Block 1002 determines the occurrence of one or more physical events associated with a user device. As described above, the occurrence of one or more physical events associated with the user device 102 may be identified by analyzing a portion of sensor data 110 from the user device 102, from the environmental data 114, or a combination thereof to identify one or more physical events exceeding pre-determined thresholds.

Block 1004 determines one or more recommendation factors based at least in part on the occurrence of one or more physical events associated with the user device 102. As described above with regard to FIG. 5, the recommendation factors 418 may comprise one or more of the elapsed time since purchase 418(1) of the user device, the elapsed time since initial activation 418(2) of the user device, the nature of the physical event 418(3), the elapsed time since the one or more physical events 418(4), the frequency of the one or more physical events 418(5), the severity of the one or more physical events 418(6), and so forth.

Block 1006 generates one or more recommended items 422 based at least in part on the one or more recommendation factors 418. These recommended items 422 may comprise a warranty service for the user device 102 when the one or more physical events associated with the user device are below a pre-determined damage threshold.

Block 1008 provides at least a portion of the one or more recommended items 422 to the user device 102 or another device for presentation to the user 104.

Block 1010 receives an order for at least a portion of the one or more recommended items 422. In some implementations, the order may be initiated based at least in part on a previously specified preference associated with the user device 102. For example, the user 104 at time of purchase may choose to opt-in such that when a physical event occurs, the extended warranty item 422(1) is purchased automatically.

Returning to the identification of the occurrence of the one or more physical events of block 1002, in some implementations, the identification may comprise analyzing at least a portion of the sensor data 110 from the user device 102 to identify one or more physical events. The sensor data 110 may be generated at least in part by the sensors 210 coupled to the user device 102. For example, the microphone 210(2) of the user device 102 may detect a sound of water running which occurs above a certain volume level. This sensor data 110 may be indicative of a physical event of rain or exposure to water.

The identification may also comprise analyzing a location of the user device 102 and the environmental data 114 associated with the location to identify the one or more physical events. For example, the environmental data 114 retrieved via the network 106 from another server may indicate heavy rain in the city where the user device 102 is located. The environmental data 114 may be received from another server, data input device such as an automated weather station, and so forth.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
  an accelerometer configured to provide acceleration data indicative of one or more physical motions of the device;
  a location device configured to provide location data indicative of a position or speed of the device;
  at least one memory storing computer-executable instructions;
  at least one processor communicatively coupled to the accelerometer, the location device and the at least one memory and configured to execute the computer-executable instructions to:
    receive the acceleration data provided by the accelerometer and the location data provided by the location device;
    determine occurrence of one or more physical events when the acceleration data exceeds a pre-determined minimum threshold and is below a pre-determined maximum threshold;
    at least partly based on the determination of the occurrence of one or more physical events, perform a diagnostic of at least a portion of the device to generate diagnostic data; and
    present an advertisement for one or more items based at least in part on the location data, diagnostic data, and the determination of the occurrence of one or more physical events.

2. The device of claim 1, wherein the acceleration data includes information indicative of an acceleration of the device.

3. The device of claim 1, wherein when the diagnostic returns diagnostic data indicating that one or more components of the device are operating within pre-determined limits, the one or more items comprise an extended warranty for the device.

4. The device of claim 1, wherein when the diagnostic returns diagnostic data indicating that the device is operational outside pre-determined limits or non-operational, and the one or more items comprise a repair service, a warranty replacement, or both.

5. One or more non-transitory computer-readable media storing computer-executable instructions that, when executed by at least one processor, configure the at least one processor to perform operations comprising:
  receiving sensor data from two sensors of a user device;
  detecting occurrence of two physical events of the user device, wherein for at least one physical event of the two physical events the sensor data from the two sensors exceeds a pre-determined minimum magnitude threshold and is below a pre-determined maximum magnitude threshold; and
  based at least in part on the detected occurrence of the two physical events, generating a recommendation of one or more items.

6. The one or more non-transitory computer-readable media of claim 5, the sensor data comprising data for two or more of acceleration, exposure to moisture, temperature, or proximity to another object.

7. The one or more non-transitory computer-readable media of claim 5, wherein the two physical events comprise an automobile accident and the recommendation of one or more items comprises recommendation of personal services.

8. The one or more non-transitory computer-readable media of claim 5, the operations further comprising determining environmental data associated with the user device and the generating the recommendation based at least in part on the environmental data.

9. The one or more non-transitory computer-readable media of claim 8, the operations further comprising retrieving the environmental data from a server via a network interface.

10. The one or more non-transitory computer-readable media of claim 8, the environmental data comprising current weather, predicted weather, past weather, or a combination thereof associated with a location of the user device.

11. The one or more non-transitory computer-readable media of claim 5, further comprising receiving diagnostic data from the user device, and the generating the recommendation based at least in part on the diagnostic data.

12. The one or more non-transitory computer-readable media of claim 11, the diagnostic data from the user device comprising an indication that a display is damaged.

13. The one or more non-transitory computer-readable media of claim 5, wherein the pre-determined maximum magnitude threshold is a damage threshold at which damage to the user device is highly likely.

14. One or more non-transitory computer-readable media storing computer-executable instructions that, when executed by at least one processor, configure the at least one processor to perform operations comprising:
  determining occurrence of two or more physical events associated with a user device;
  determining one or more recommendation factors based at least in part on the occurrence of the two or more physical events associated with the user device, wherein determining the occurrence of the two or more physical events comprises analyzing a portion of sensor data from the user device, wherein the portion of the sensor data is in excess of one or more pre-determined thresholds of minimum severity and is below one or more pre-determined thresholds of maximum severity; and
  generating one or more recommended items based at least in part on the one or more recommendation factors.

15. The one or more non-transitory computer-readable media of claim 14, wherein the determining occurrence of the two or more physical events associated with the user device further comprises detecting a sound of water with a microphone of the user device.

16. The one or more non-transitory computer-readable media of claim 14, the one or more recommendation factors comprising one or more of:
  an elapsed time since purchase of the user device;
  an elapsed time since initial activation of the user device;
  an elapsed time since the two or more physical events; or
  a nature of at least one of the two or more physical events.

17. The one or more non-transitory computer-readable media of claim 14, wherein the determining the occurrence of the two or more physical events further comprises analyzing a location of the user device and environmental data associated with the location.

18. The one or more non-transitory computer-readable media of claim 14, further comprises receiving an order for at least a portion of the one or more recommended items.

19. The one or more non-transitory computer-readable media of claim 14, wherein the one or more recommended items comprises a warranty service for the user device when sensor data monitored during occurrence of the two or more physical events does not exceed a pre-determined damage threshold.

20. The one or more non-transitory computer-readable media of claim 14, further comprising, based at least in part on a previously specified preference associated with the user device, initiating an order for at least a portion of the one or more recommended items.

21. The one or more non-transitory computer-readable media of claim 14, further comprising one or more of the following sensors coupled to the user device and configured to generate the sensor data:
- an accelerometer;
- a microphone;
- a hygrometer;
- a thermometer;
- a global positioning system receiver;
- a pressure sensor; or
- a proximity sensor.

* * * * *